(12) United States Patent
Pescheck et al.

(10) Patent No.: US 7,841,456 B2
(45) Date of Patent: Nov. 30, 2010

(54) ADJUSTABLE HYSTERESIS DRIVER

(75) Inventors: Jürgen Pescheck, Immenstaad (DE); Stefan Unseld, Weissensberg (DE); Konrad Thoma, Friedrichshafen (DE)

(73) Assignee: 2F Friedrichshafen AG, Friedrichshafen (DE)

( * ) Notice: Subject to any disclaimer, the term of this patent is extended or adjusted under 35 U.S.C. 154(b) by 605 days.

(21) Appl. No.: 11/792,006

(22) PCT Filed: Nov. 29, 2005

(86) PCT No.: PCT/EP2005/012710

§ 371 (c)(1),
(2), (4) Date: Feb. 4, 2008

(87) PCT Pub. No.: WO2006/058688

PCT Pub. Date: Jun. 8, 2006

(65) Prior Publication Data

US 2008/0210512 A1 Sep. 4, 2008

(30) Foreign Application Priority Data

Dec. 1, 2004 (DE) ........................ 10 2004 057 848

(51) Int. Cl.
- *H02K 49/04* (2006.01)
- *H02K 7/102* (2006.01)
- *H02K 7/108* (2006.01)
- *F16D 27/12* (2006.01)

(52) U.S. Cl. .................... 192/48.2; 192/84.31; 188/164; 310/100; 310/105

(58) Field of Classification Search ............... 192/84.31; 310/96, 100
See application file for complete search history.

(56) References Cited

U.S. PATENT DOCUMENTS

| 1,697,292 | A | | 1/1929 | Sperry |
| 2,499,036 | A | * | 2/1950 | Plantet ........................ 310/100 |
| 3,240,969 | A | * | 3/1966 | Jaeschke ...................... 310/94 |
| 3,601,641 | A | | 8/1971 | Baermann |

(Continued)

FOREIGN PATENT DOCUMENTS

DE   2 261 708   6/1974

(Continued)

*Primary Examiner*—Richard M. Lorence
(74) *Attorney, Agent, or Firm*—Davis & Bujold P.L.L.C.

(57) ABSTRACT

The invention concerns an adjustable hysteresis driver, with a rotor component (5) on the input side that can be driven and/or a stator component (7', 7"), with an armature component (8) on the output side in fixed connection with a shaft (4), with a hysteresis component (9) connected to the armature component (8), the stator component (7', 7") comprising an electromagnet (7a) or permanent magnet (18) by means of which a magnetic flux can be induced in the rotor component (5) and/or the stator component (7', 7"), and in which the torque that can be transmitted can be adjusted by electromagnetic or electro-mechanical means. The purpose of the invention is to propose a hysteresis driver with improved adjustability. To achieve this it is provided that the hysteresis driver consists of a hysteresis clutch or a hysteresis brake and has active operating means for implementing a "fail-safe" function, which, if the current supply to the electromagnet (7a) fails, ensures that a torque is transferred either by a mechanical coupling or by the action of permanent magnet force between the rotor component (5) of a hysteresis clutch or the stator component (7") of a hysteresis brake and the said armature component (8).

10 Claims, 4 Drawing Sheets

U.S. PATENT DOCUMENTS

| | | | |
|---|---|---|---|
| 5,898,249 A * | 4/1999 | Boggs, III | 310/105 |
| 6,007,303 A | 12/1999 | Schmidt | |
| 6,244,395 B1 | 6/2001 | Schlagenhaft | |
| 6,915,887 B2 | 7/2005 | Faller et al. | |
| 2003/0196863 A1 * | 10/2003 | Faller et al. | 192/48.3 |

FOREIGN PATENT DOCUMENTS

| DE | 36 28 285 | 3/1987 |
|---|---|---|
| DE | 37 32 766 | 4/1988 |
| DE | 39 05 216 | 9/1989 |
| DE | 197 46 359 | 7/1998 |
| DE | 198 01 334 | 7/1999 |
| DE | 199 17 667 | 10/2000 |
| DE | 100 18 721 | 10/2001 |
| DE | 101 58 732 | 6/2003 |
| DE | 102 06 544 | 8/2003 |
| EP | 0 855 515 | 11/1997 |
| GB | 1 294 465 | 10/1972 |

* cited by examiner

ADJUSTABLE HYSTERESIS DRIVER

This application is a national stage completion of PCT/EP2005/012710 filed Nov. 29, 2005 which claims priority from German Application Serial No. 10 2004 057 848.6 filed Dec. 1, 2004.

FIELD OF THE INVENTION

The invention relates to an adjustable hysteresis driver.

BACKGROUND OF THE INVENTION

Hysteresis drivers in the form of hysteresis clutches or hysteresis brakes have long been known in many forms. The advantage of such clutches or brakes consists essentially in their ability to transmit torque without contact, across an air gap. The way these devices work relies on the magnetic force action of mutually attracting poles in synchronous operation or a continual magnetic reversal of a permanently magnetic hysteresis material moved past these poles in slipping operation. For example electromagnetically energizable hysteresis clutches are known from DE 39 05 216 A1 and DE 199 17 667 A1, whose transmitted torque can be adjusted as a function of the current flowing through an energizing coil.

In addition, from DE 37 32 766 A1 a permanent-magnet-energized hysteresis clutch is known, in which the torque to be transmitted can be changed by manually varying the insertion depth of an annular hysteresis element into an air gap formed between two pole rings of the permanent magnet.

Furthermore, from DE 2 261 708 A it is known to operate a hysteresis clutch of an auxiliary aggregate drive of a motor vehicle in such manner that it is activated or deactivated as a function of the temperature of the coolant liquid or oil of an internal combustion engine. This hysteresis clutch comprises electromagnets that can be switched on, i.e. a plurality of electromagnetic fields, with poles complementary to one another.

Moreover, from DE 197 46 359 C2 and DE 100 18 721 A1 adjustable coolant pumps for motor vehicles with hysteresis clutches are known. The first of these documents describing a permanent-magnet-energized hysteresis clutch, one clutch half of which can be displaced axially by means of an electrically driven adjustor unit so that the gap width of the air gap between the two halves of the clutch, and consequently the torque to be transmitted, can be varied as a function of the operating condition of the combustion engine. On the other hand DE 100 18 721 A1 concerns an electromagnetically energized hysteresis clutch by which the torque to be transmitted can be regulated or adjusted as a function of the size of the current flowing through the coil of an electromagnet.

These known hysteresis clutches are similar in that they all use electric or electro-mechanical regulation of the torque transfer, which is associated with the disadvantage that if the current supply to such hysteresis clutches should fail, they can no longer carry out their intended purpose.

Against that background the purpose of the present invention is to propose a hysteresis driver, such as a hysteresis clutch or a hysteresis brake, whose adjustment or regulation is improved, in that on the one hand it enables continuously variable torque adjustment and on the other hand it can still transmit torque even if the current supply has failed. Such a hysteresis driver should for example also be suitable for use as an auxiliary drive of a motor vehicle engine or an auxiliary drive output.

SUMMARY OF THE INVENTION

Accordingly, the invention starts with an adjustable hysteresis driver having a rotor component on the input side that can be driven mechanically and/or a stator component, with an armature component in rotationally fixed connection with a shaft, with a hysteresis component connected to the armature component, the stator component comprising at least one electromagnet or permanent magnet by means of which a magnetic flux can be induced in the rotor component and/or the stator component, and in which the torque that can be transmitted is adjustable electromagnetically or electro-mechanically, for example, by a servomotor which adjusts the insertion depth. To achieve the stated objective it is also provided that the hysteresis drive is formed by a hysteresis clutch or a hysteresis brake, and has an active means for implementing a "fail-safe" function which, in the event of a failure of the current supply to the electromagnet, ensures that torque is still transmitted between the rotor component of a hysteresis clutch or the stator component of a hysteresis brake and the armature component, by virtue either of a mechanical coupling or the force of a permanent magnet.

Thanks to this measure it is advantageously ensured, for example when the hysteresis clutch is used in an auxiliary drive of an internal combustion engine of a motor vehicle, that even in the event of a failure of the current supply to the energizing coil of the electromagnet, torque can still be transmitted from the input side to the output side of the clutch. This can, for example, be particularly important if the auxiliary drive of the combustion engine drives a vehicle cooling system with the crankshaft of the combustion engine via the hysteresis clutch, the system being required to dissipate heat even when the current supply has failed or is defective.

In the case of a hysteresis brake formed according to the invention it should be noted that if the current supply to the energizing coil of the electromagnet fails, again torque—in this case a negative torque—can be transmitted to the armature and the shaft connected thereto, which can be a shaft connected to an auxiliary component.

In the case of a hysteresis clutch developed according to the invention, the means for implementing the "fail-safe" function in a first variant of the invention comprises at least a first mechanical clutch element that is connected in a rotationally fixed manner to the rotor component, but is able to move axially, which in the event of failure of the current supply to the electromagnet, can be connected frictionally and/or with a form-fit to a second mechanical clutch element which is in fixed connection with the armature component In contrast, in the case of a hysteresis brake the means for implementing the "fail-safe" function comprise at least a first mechanical clutch element connected directly and in a rotationally fixed manner to the stator component but is able to move axially, such that in the event of failure of the current supply to the electromagnet, it can be connected frictionally and/or with a form-fit to a second mechanical clutch element which is in fixed connection with the armature component.

Furthermore, according to the invention the first mechanical clutch element is preferably a brake disk and the second mechanical clutch element is preferably a friction lining.

In another embodiment of the invention, however, the two mutually corresponding mechanical clutch elements can also be components of a gear-type coupling.

It is also regarded as expedient for the first mechanical clutch element to be adjustable by the force of a spring in the axial direction relative to the corresponding, second mechanical clutch element, but during normal operation is fixed by magnetic force on the rotor component of a hysteresis clutch or on the stator component of a hysteresis brake. This magnetic force for the local fixation of the first mechanical clutch element is produced by the energizing coil of the electromagnet or by the energizing coil of a separate, additional electromagnet.

It is also preferable to provide an overload protection system which reduces and/or removes an existing frictional and/or interlocking connection made between the two clutch elements. This enables parts, for example, of an auxiliary component drive or auxiliary drive output that co-operate with the hysteresis clutch or hysteresis brake, to be protected effectively against damage.

According to a second variant of the invention, the hysteresis driver can be made such that to enable adjustment of its torque transmission capacity there is associated with at least one permanent magnet at least one electromagnet whose magnetic field changes or counteracts that of the permanent magnet as a function of the voltage applied. In this case, the means for implementing a "fail-safe" function of the hysteresis driver consist of the permanent magnet itself, whose magnetic field, if the current supply to the electromagnet fails, continues to function normally and accordingly ensures that the rotor component of a hysteresis clutch or the stator component of a hysteresis brake is coupled with the armature component for torque transmission.

In contrast, in a third variant of the invention, to adjust the torque transmission capacity of the hysteresis driver, an electro-mechanical adjustor unit is provided to vary the overlap between the rotor component of a hysteresis clutch or the stator component of a hysteresis brake and the hysteresis component, such that the means for implementing a "fail-safe" function are formed by at least one spring element which, if the current supply to the electromagnet fails, automatically moves the rotor component of the hysteresis clutch or stator component of the hysteresis brake and the hysteresis component including the armature component into a position relative to one another such that torque transfer is ensured.

BRIEF DESCRIPTION OF THE DRAWINGS

To clarify the invention, drawings are attached and described and show in.

DETAILED DESCRIPTION OF THE INVENTION

Figure 1:
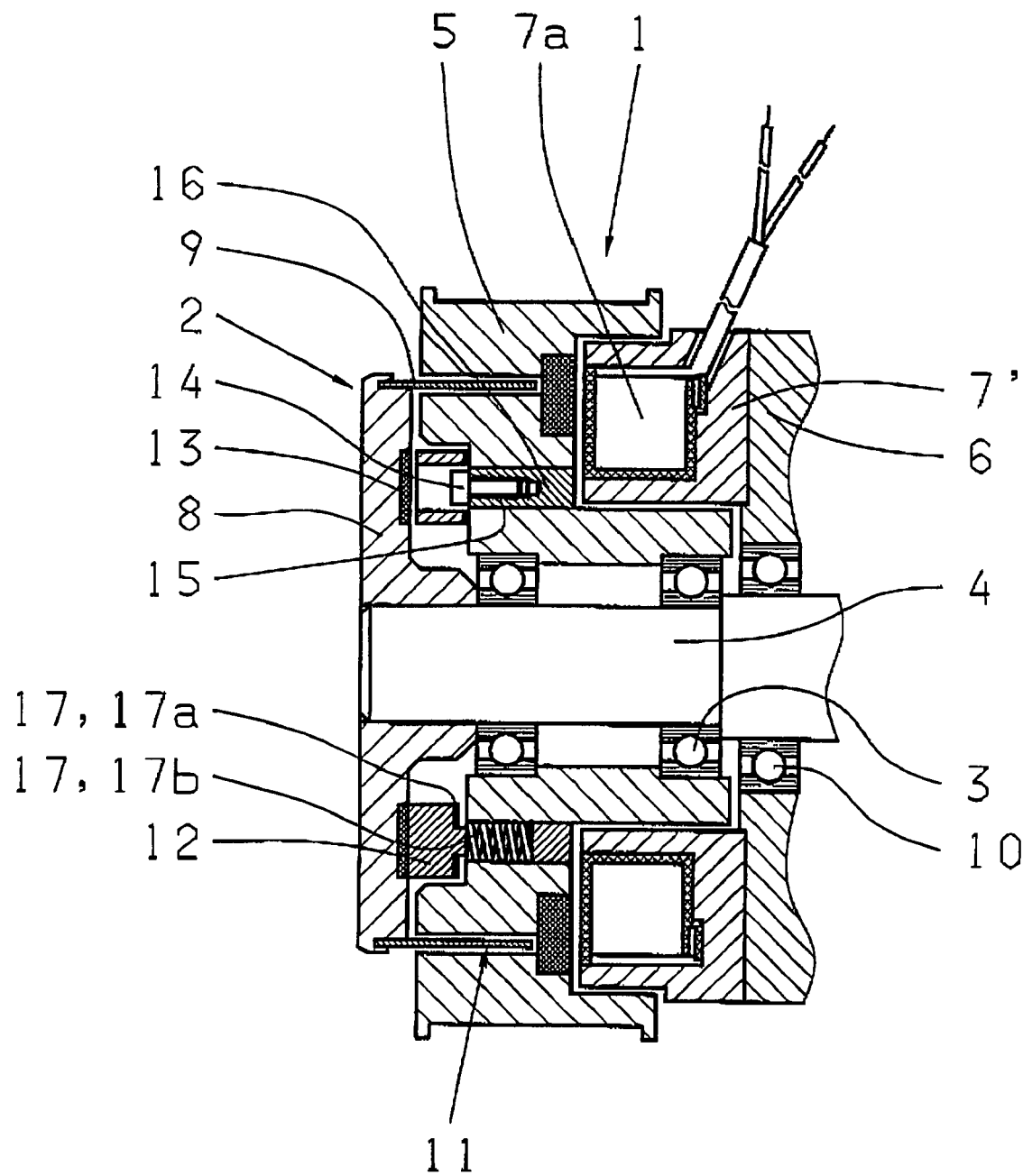
FIG. 1 is a sectional view of a hysteresis driver according to the invention, in the form of a first embodiment of a hysteresis clutch.

The hysteresis clutch shown in FIG. 1 comprises an energizing unit 1 and a hysteresis unit 2, which co-operate in relation to the functionality of the hysteresis clutch. The energizing unit 1 comprises, first, a rotor component 5 which is rotationally supported via a ball bearing 3 on a shaft 4, which is in this case a drive output shaft, and is made as a traction sheave which can be driven, via flexible wrap-around means (not shown), by the crankshaft of a combustion engine of a motor vehicle. In addition there is a stator component 7' which is connected to a fixed housing 6 and which comprises an electromagnet 7a, that in part coaxially surrounds the shaft 4 and a section of the rotor component 5 close to the shaft.

The hysteresis unit 2 is formed by a rotationally symmetric armature component 8, which is connected in a rotationally fixed manner to the radially inner shaft 4, and on the radial outside comprises a hysteresis component 9 in the form of an axially extending hysteresis annulus made of a known homogeneous hysteresis material.

The shaft 4 is supported by a ball bearing 10 on the fixed housing 6 and is connected to an auxiliary component not shown in more detail, which can for example be a coolant pump or a fan.

The hysteresis component 9, formed as a hysteresis ring, extends axially into an axially extending air gap 11 in the rotor 5, which is made of a magnetically soft material, without contacting the latter. When an electric voltage is applied to the energizing coil of the electromagnet 7a of the stator component 7', the flow of current through the coil produces a magnetic field which induces a magnetic flux, in the driven rotor component 5 having pole to pole alternating polarity. Rotation of rotor 5 causes in the hysteresis material of the hysteresis component 9 to continually reorient of elementary magnetic domains, whereby a torque is exerted on the armature component 8 in fixed connection with the hysteresis component 9. The shaft 4, connected in a rotationally fixed manner with the armature component 8 then transmits the torque to the connected auxiliary component.

For those with an understanding of the subject it is easy, with knowledge of the invention, to perceive that if the current supply to the electromagnet 7a fails, the electromagnetic coupling between the rotor component 5 and the armature component 8 is interrupted because the necessary magnetic fields of the electromagnet 7a that are produced in alternation with one another can no longer be formed. This can lead to critical operating conditions of the combustion engine and/or other parts of a motor vehicle that rely on proper operation of the auxiliary component.

To be able to overcome this critical operating situation effectively, according to the invention at least one active operating means for implementing a so-termed "fail-safe" function of the hysteresis clutch is provided, which, even if the current supply to the electromagnet 7a has failed, ensures a defined coupling between the rotor component 5 and the armature component 8 in order to transmit a torque from the combustion engine to the auxiliary aggregate.

According to the variant of the invention shown in FIG. 1, the means for implementing this "fail-safe" function of the hysteresis clutch consist of at least a first axially slidable mechanical clutch element 12 connected in a rotationally fixed manner to the rotor component 5, which, if the current supply fails, can be connected frictionally and/or with a form-fit interlock to a second mechanical clutch element 13 which is fixed in connection to the armature component 8.

In the present case, the first mechanical clutch element 12 is formed as a friction disk. Expediently, it consists of a magnetic ferrous material. The first mechanical clutch element 12 can be attached in a rotationally fixed and axially movable manner to the rotor component 5, for example by means of guide bolts or screws 14 located in guide holes 15 of the rotor component 5.

In the embodiment illustrated, the first mechanical clutch element 12 can, for example, be pressed by a spiral compression spring 17b against the frictional surface 13 on the armature component 8.

Alternatively, the first mechanical clutch element 12 is connected to a membrane spring 17a, which can also transmit torque and which allows axial movement of the clutch element 12. This membrane spring 17a is connected to the rotor component 5, for example, by screws.

To produce a magnetic tensile force on the first mechanical clutch element 12, magnetic isolation is required in the rotor component 5, in the material of which the guide bolts or screws 14 or the spiral compression springs 17b are arranged.

During normal operation, i.e. when an electric current is flowing through the windings of the energizing coil of the electromagnet 7a, the current flow produces a magnetic field, which on one hand induces a magnetic flux in the driven rotor component 5, but on the other hand also secures the first mechanical clutch element 12 on the rotor component 5 by means of magnetic force against the spring force of the spring elements 17.

Instead of the magnetic force produced by the energizing coil of the electromagnet 7a, the magnetic force of the energizing coil of a separate, additional magnet can also be used to fix the first mechanical clutch element 12 to the rotor component 5 (this option not being illustrated).

When the current flow through the energizing coil of the electromagnet 7a fails due to a defect, the spring elements 17 press the first mechanical clutch element 12 (the friction disk) against the second mechanical clutch element 13 (the friction lining), thereby producing a frictional engagement that ensures torque transmission from the input side to the output side of the hysteresis clutch.

By virtue of the spring force of the spring elements 17, a minimum transmissible force between the two mechanical clutch elements 12 and 13 can be set to prevent overload of components and assemblies such as a drive belt.

Instead of frictional engagement between a friction disk and a corresponding friction lining, according to another variant of the invention, means can also be provided to establish a form-fit interlocking engagement between the rotor component 5 and the armature component 8 of the hysteresis clutch. Suitable for this are, for example, clutch elements of a gear-type clutch, known as such, and preferably of annular shape (not shown), which can be brought into interlocking engagement with one another.

Following the principle of the preceding embodiment, the clutch elements of such a gear-type clutch are also made from a ferrous material and are kept apart by the magnetic force during normal operation, i.e. when current is flowing through the energizing coil of the electromagnet 7a. Only if the current supply to the electromagnet 7a has failed are these two mechanical clutch elements also brought into mutual interlocking engagement by a spring force.

Figure 2:
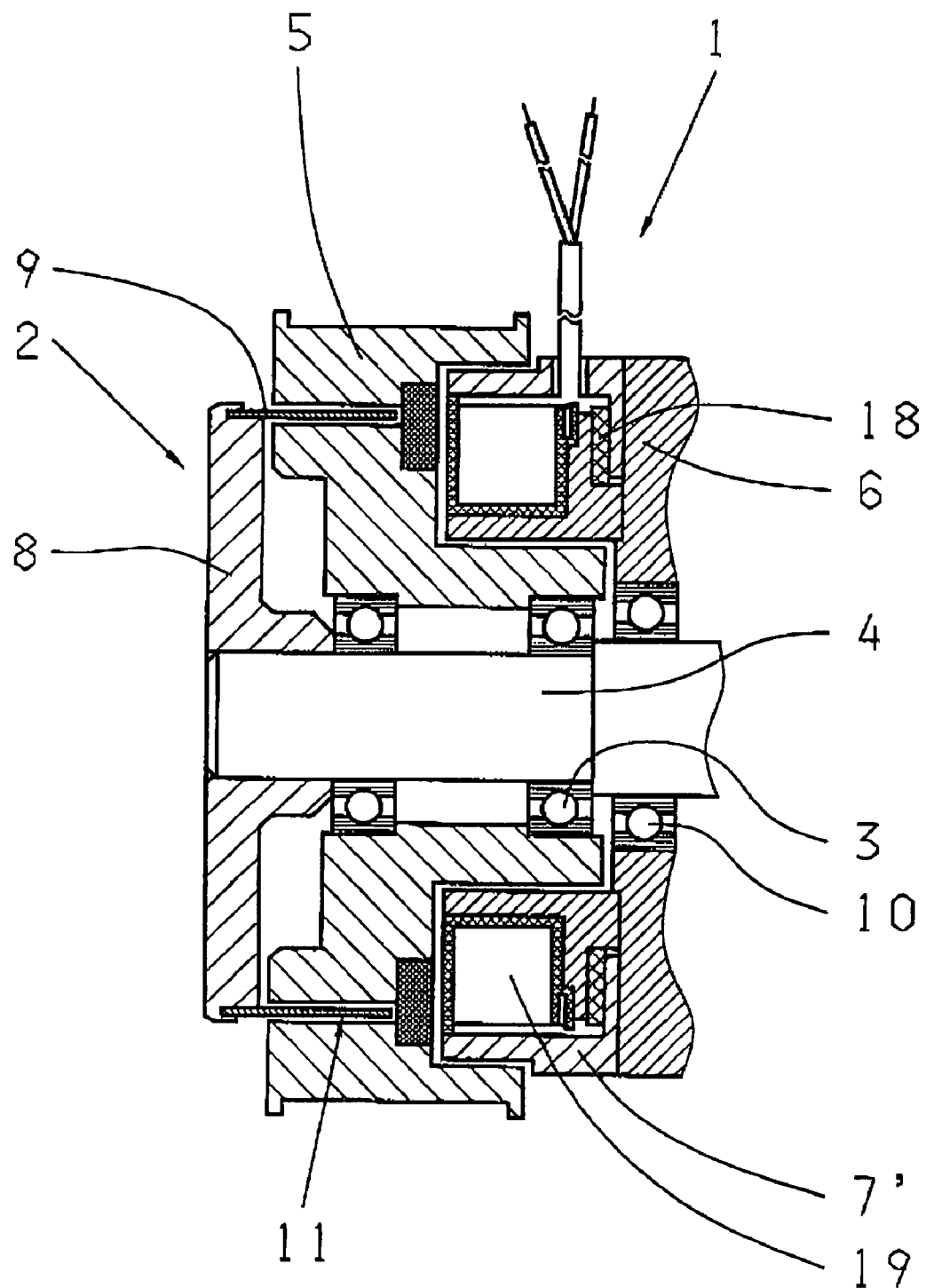
FIG. 2 is a sectional view of a second embodiment of the hysteresis clutch according to the invention.

FIG. 2 shows a second embodiment of the hysteresis clutch made in accordance with the invention. This differs from the hysteresis clutch described above essentially in that the rotor component 5 can be activated by at least one permanent magnet 18 fixed on the stator component 7' instead of electromagnetically.

For adjusting of the torque that can be transmitted by the hysteresis clutch, this at least one permanent magnet 18 is associated with at least one electromagnet 19, which is also fixed on the stator component 7'. As a function of the applied voltage or the current flowing through the electromagnet 19, the electromagnet 19 offsets the magnetic field of the permanent magnet 18, to a greater or lesser extent, so that a greater or lesser amount of slip exists between the rotor component 5 and the hysteresis unit 2, which comprises the armature component 8 and the hysteresis component 9 attached thereto, whereby the amount of torque through the hysteresis clutch can be adjusted.

If the current supply to the electromagnet 19 fails due to a functional defect, the magnetic field of the permanent magnet 19 remains fully active such that a defined torque is transmitted to the armature component 8, the shaft 4 fixed thereto, and the hysteresis component 9, and thus to the auxiliary component.

In a third possible design variant of the invention (not illustrated) the starting point is a hysteresis clutch, with rotor component 5, that can be activated by at least one permanent magnet 18 and in which the clutch torque is adjusted by an electro-mechanical adjustor unit which changes the overlap or separation between the rotor component 5 and the hysteresis component 9. Such an electro-mechanical adjustor unit, known in its own right, is described for example in DE 197 46 359 C2.

To implement a "fail-safe" function in a hysteresis clutch of this type, according to the invention at least one spring element is provided, which, if the current supply to the electro-mechanical adjustor unit fails, automatically brings the rotor component 5 and the hysteresis component 9 to a position relative to one another which ensures coupling of the rotor component 5 to the hysteresis component 9 with the armature component 8 for transmitting a torque from the input side to the output side of the hysteresis clutch.

The embodiments described above are based on a hysteresis driver in the form of a hysteresis clutch. However, the invention also includes a hysteresis brake, which essentially applies a negative torque to an armature component 8 in that is connected rotationally fixed manner with a shaft 4. The shaft 4 can, for example, be a driven connecting shaft attached to an auxiliary component (not shown).

Figure 3:
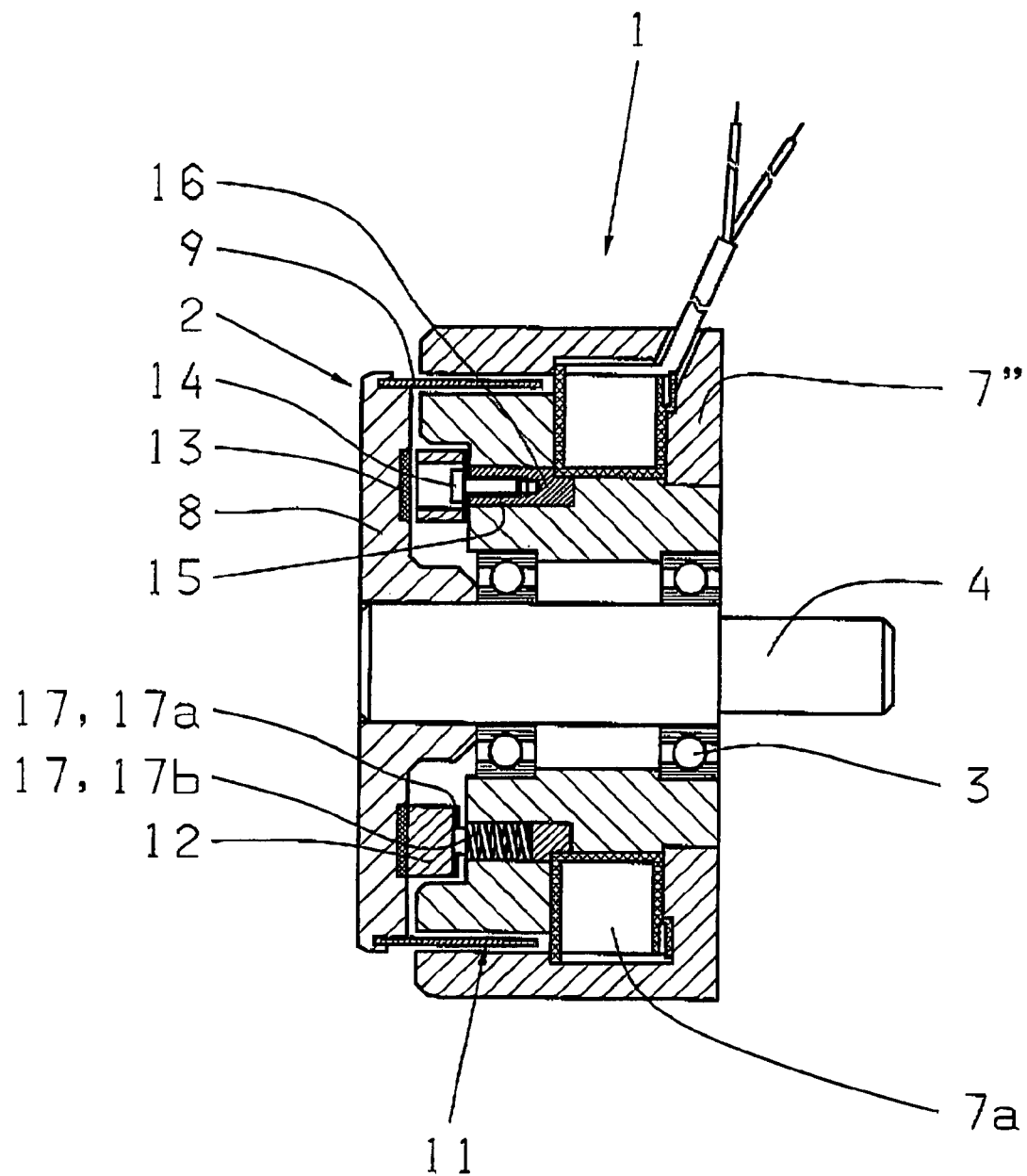
FIG. 3 is a sectional view of a hysteresis driver according to the invention, in the form of a first embodiment of a hysteresis brake.
Figure 4:
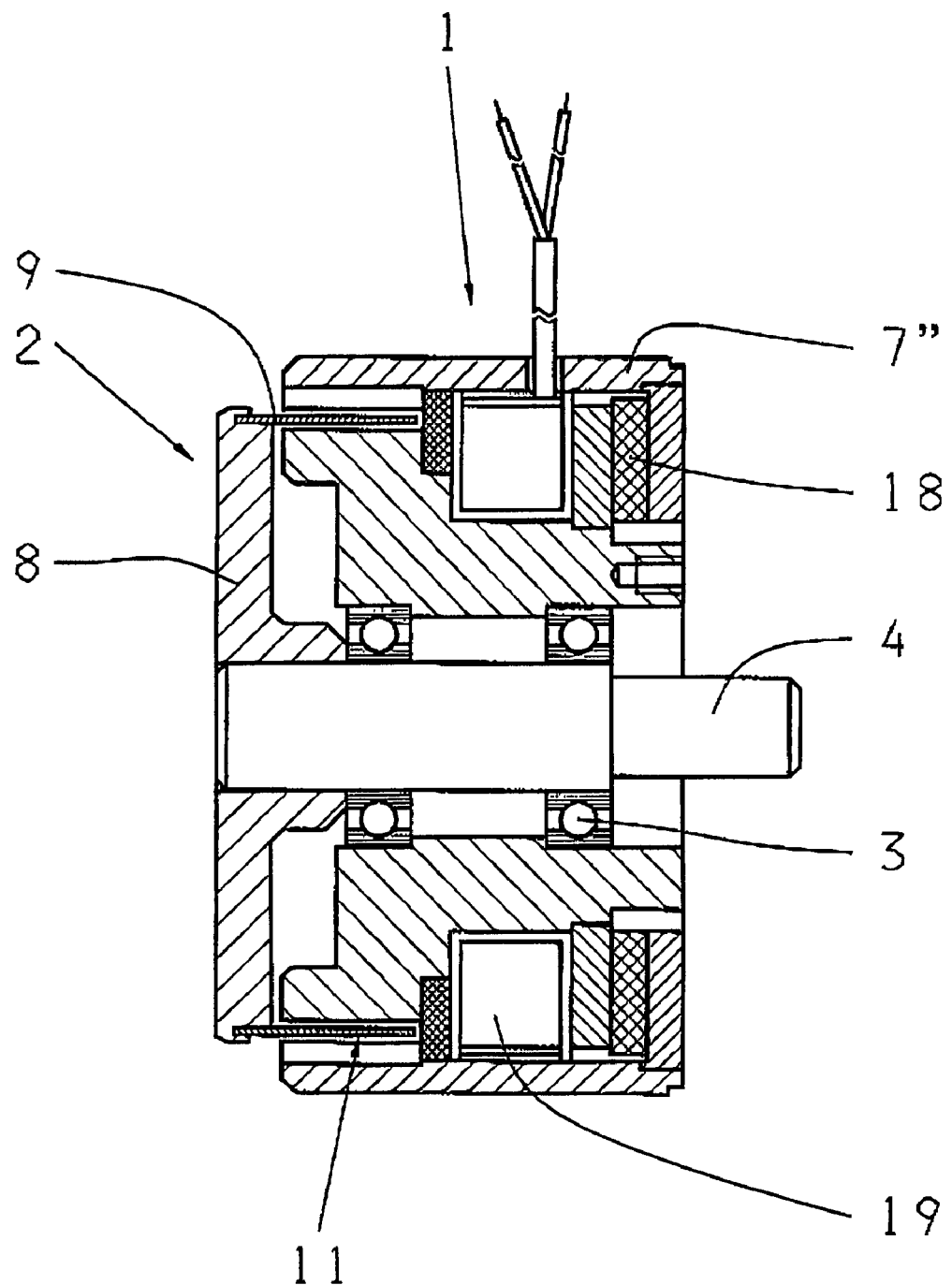
FIG. 4 is a sectional view of a second embodiment of the hysteresis brake according to the invention.

According to FIGS. 3 and 4, the design of the hysteresis brake in question differs from that of the hysteresis clutch described earlier, first and foremost only in that in this case there is no need for a rotor component 5. The hysteresis component 9 made as an axially extending hysteresis ring now extends directly axially into an also axially extending air gap 11 of the stator component 7", which is made of a magnetically soft material and contains the electromagnet 7a. When an electric voltage is applied to the energizing coil of the electromagnet 7a of the stator component 7", the current flowing in the coil produces a magnetic field which, as is known, leads to a continuous reorientation of elementary magnetic domains in the hysteresis material of the hysteresis component 9 being rotationally driven by an external force via the shaft 4 and the armature component 8, whereby in turn a negative torque in the sense of a braking force can be applied on the armature component 8 which is fixed with the hysteresis component 9, and hence on the shaft 4.

To deal effectively, in this case too, with the critical operating situation when the current supply to the electromagnet 7a fails, i.e. to implement a "fail-safe" function, a first mechanical clutch element 12 of the type described earlier is again provided, which, in the event of current supply failure, can be brought into frictional and/or a form-fit engagement with a second mechanical clutch element 13, which is fixed with the armature component 8. In contrast to the hysteresis clutch, however, the first mechanical clutch element 12 is now supported directly on the stator component 7" and is therefore in a fixed position (FIG. 3).

With regard to the other design features and particular operating modes of the clutch elements 12, 13 as a friction disk/friction lining combination or as a gear-type coupling, there are no differences compared with the hysteresis clutch described earlier, so no corresponding explanations are needed and in the figures the same reference numerals are used for the same components.

FIG. 4 shows a hysteresis brake which, like the principle of the hysteresis clutch illustrated in FIG. 2, can be energized instead of electromagnetically by at least one permanent magnet 18 fixed on the stator component 7".

At least one electromagnet 19 is again associated with the at least one permanent magnet 18 for adjusting a negative torque or braking torque that can be transmitted by the hysteresis brake to the shaft 4. As a function of the voltage applied or the current flowing through the electromagnet 19, the magnetic field of the electromagnet 19 offsets the magnetic field of the permanent magnet 18, to a greater or lesser extent, whereby the magnitude of the negative torque produced by the hysteresis brake can be adjusted.

If the current supply to the electromagnet 19 fails because of a defect, the magnetic field of the permanent magnet 18 remains fully active and as a result a defined negative torque is transmitted to the armature component 8 to which the shaft 4 and the hysteresis component 9, and hence to the auxiliary aggregate.

According to a third possible design variant (not shown), the starting point is a hysteresis brake which can be activated by at least one permanent magnet 18, which is fixed on the stator component 7". As already described earlier for the hysteresis clutch, the negative torque to be applied can here too be adjusted by means of an electro-mechanical adjustor unit which changes the overlap or separation between the stator component 7" and the hysteresis component 9.

To implement a "fail-safe" function in a hysteresis brake of this type, a spring element is again provided, which, if the current supply to the electro-mechanical adjustor unit fails, automatically brings the stator component 7" and the hysteresis component 9 to a position relative to one another that ensures a coupling between the stator component 7" and the hysteresis component 9 with its armature component 8, so that a defined negative torque is transmitted.

INDEXES

1 Energizing unit
2 Hysteresis unit
3 Ball bearing
4 Shaft
5 Rotor component
6 Housing
7', 7" Stator component
8 Armature component
9 Hysteresis component
10 Ball bearing
11 Air gap
12 First mechanical clutch element (on the rotor component 5 or the stator component 7")
13 Second mechanical clutch element (on the armature component 8)
14 Guide bolts, screws
15 Guide holes
16 Magnetic isolation
17 Spring elements
17a Membrane spring
17b Spiral compression spring
18 Permanent magnet
19 Electromagnet

The invention claimed is:
1. An adjustable hysteresis driver comprising:
a rotor component (5), being drivable and rotatably supported by a shaft (4), and a stator component (7');
an armature component (8) being fixed to the shaft (4);
a hysteresis component (9) being connected to the armature component (8);
the stator component (7') comprises an electromagnet (7a) which induces magnetic flux in the rotor component (5) and in the stator component (7') such that the rotor component (5) electromagnetically couples the armature component (8) to transmit torque therebetween, the torque transmitted between the rotor component (5) and the armature component (8) being electromagnetically adjustable;
a hysteresis clutch for implementing "fail-safe" operation, if electrical current to the electromagnet (7a) fails, to ensure that torque is transferred between the rotor component (5) of the hysteresis clutch and the armature component (8),
the hysteresis clutch comprising a first mechanical clutch element (12) that is rotationally fixed to the rotor component (5) and axially movable, such that during "fail safe" operation when supply of the electrical current to the electromagnet (7a) fails, the first mechanical clutch element (12) engages a second mechanical clutch element (13) which is fixed to the armature component (8);
the first mechanical clutch element (12) is biased towards the second mechanical clutch element (13) by a spring force during "fail safe" operation and is fixed by magnetic force on the rotor component (5) of the hysteresis clutch by the electromagnet (7a) during normal operation; and
the spring force providing overload protection which at least reduces engagement between the first and the second mechanical clutch elements (12,13).

2. The adjustable hysteresis driver according to claim 1, wherein the first mechanical clutch element (12) is connected with the rotor component (5) in a rotationally fixed, axially slidable manner such that if the current supply to the electromagnet (7a) fails, the first mechanical clutch element (12) one of frictionally and form-fittingly engages the second mechanical clutch element (13) which is fixed to the armature component (8).

3. The adjustable hysteresis driver according to claim 2, wherein the first mechanical clutch element (12) is a friction ring and the second mechanical clutch element (13) is a friction lining.

4. The adjustable hysteresis driver according to claim 2, wherein the first mechanical clutch element (12) and the second mechanical clutch element (13) are components of a gear-type clutch.

5. The adjustable hysteresis driver according to claim 2, wherein the first mechanical clutch element (12) and the second mechanical clutch element (13) are brought into engagement by the spring force, if the current supply to the electromagnet (7a) fails, and during normal operation, when the current is supplied to the electromagnet (7a), the first mechanical clutch element (12) is biassed by a magnetic force toward one of the rotor component (5) and the stator component (7").

6. The adjustable hysteresis driver according to claim 5, wherein the magnetic force for biassing the first mechanical clutch element (12) toward one of the rotor component (5) and the stator component (7") is produced by one of an energizing coil of the electromagnet (7a) and an energizing coil of an additional magnet.

7. The adjustable hysteresis driver according to claim 2, wherein an overload protection element at least reduces at least one of an existing frictional and form-fit engagement between the at least one first mechanical clutch element (12) and the second mechanical clutch element (13).

8. An adjustable hysteresis driver comprising:
a stator component (7');
an armature component (8) on an output side being fixed with a shaft (4);
a hysteresis component (9) connected to the armature component (8);
the stator component (7') comprises an electromagnet (7a) which induces magnetic flux in the stator component (7') such that the stator component (7') electromagnetically couples the armature component (8) to transmit torque therebetween, the torque transmitted between the stator component (7') and the armature component (8) being electromagnetically adjustable by means of the electromagnet (7a);
a hysteresis brake and a mechanical coupling for implementing "fail-safe" operation, if an electrical current supply to the electromagnet (7a) fails, the mechanical coupling ensuring that torque is transferred between the stator component (7') of the hysteresis brake and the armature component (8);
the mechanical coupling comprising at least one first mechanical clutch element (12) in rotationally fixed connection with the stator component (7") and axially movable, such that during the "fail-safe" operation when supply of electric current to the electromagnet (7a) fails, the first mechanical clutch element (12) engages a second mechanical clutch element (13) which is fixed with the armature component (8),
the first mechanical clutch element (12) is moved toward the second mechanical clutch element (13) by a spring force during the "fail-safe" operation and is fixed by magnetic force on the stator component (7') of the hysteresis brake by the electromagnet (7a) during normal operation; and
the spring force providing overload protection which at least reduces engagement between the first and the second mechanical clutch elements (12,13).

9. The adjustable hysteresis driver according to claim 8, wherein the at least one first mechanical clutch element (12) is connected with the stator component (7") in a rotationally fixed, axially slidable manner such that if the current supply to the electromagnet (7a) fails, the at least one first mechanical clutch element (12) one of frictionally and form-fittingly engages the second mechanical clutch element (13) which is fixed to the armature component (8).

10. An adjustable hysteresis driver comprising:
a stator (7') being fixed to a housing (6) and comprising an electromagnet (7a);
a rotor (5) being rotatably supported by an output shaft (4) and comprising an annular air gap (11), the rotor (5) and the output shaft (4) being rotatable with respect to each other and the stator (7') and housing (6);
an armature (8) being fixed to the output shaft (4) and comprising a hysteresis component (9) that is fixed to the armature (8) and extends within the annular air gap (11) of the rotor (5), the armature (8) being rotatable with respect to the rotor (5) and the stator (7');
the electromagnet (7a) produces a magnetic field when electrical current is applied to the electromagnet (7a) and is arranged such that the magnetic field induces a magnetic flux in the rotor (5), the magnetic flux influences the hysteresis component (9) such that the hysteresis component (9) is rotationally driven by rotation of the rotor (5), torque being transmitted between the rotor (5) and the armature (8) being adjustable by means of the electromagnet (7a);
a hysteresis clutch for implementing "fail-safe" operation, if electrical current to the electromagnet (7a) fails, to ensure that torque is transferred between the rotor (5) and the armature (8);
the hysteresis clutch comprising a first mechanical clutch element (12) that is rotationally fixed to the rotor (5) and axially movable, such that during "fail safe" operation when supply of the electrical current to the electromagnet (7a) fails, the first mechanical clutch element (12) engages a second mechanical clutch element (13) which is fixed to the armature component (8);
a spring (17b) engages and applies a spring force on the first mechanical clutch element (12) to bias the first mechanical clutch element (12) into engagement with the second mechanical clutch element (13) during "fail safe" operation, the first mechanical clutch element (12) being axially biased away from the second mechanical clutch element (13), against the spring force, and fixed by magnetic force on the rotor component (5) of the hysteresis clutch by the electromagnet (7a) when current is applied to the electromagnet (7a); and
the spring force providing overload protection which at least reduces engagement between the first and the second mechanical clutch elements (12,13).

\* \* \* \* \*